UNITED STATES PATENT OFFICE.

PEDER FARUP, OF CHRISTIANIA, NORWAY.

MANUFACTURE OF COLORING-MATTER FROM TITANIFEROUS IRON MINERALS.

966,815.   Specification of Letters Patent.   Patented Aug. 9, 1910.

No Drawing.   Application filed March 11, 1910.   Serial No. 548,674.

*To all whom it may concern:*

Be it known that I, PEDER FARUP, a subject of the King of Norway, residing at Christiania, Norway, have invented certain new and useful Improvements in the Manufacture of Coloring-Matter from Titaniferous Iron Minerals; and I do hereby declare the following to be a full, clear, and exact description of the invention, such as will enable others skilled in the art to which it appertains to make and use the same.

My invention relates to the manufacture of coloring matter from titaniferous iron ores and consists in improvements in the manufacture of coloring matter of great covering power from titaniferous iron minerals, and I do hereby declare that the following is a full, clear and exact description of the same.

Coloring matters, which are to be employed as covering colors (paints or pigments) must be manufactured in a very fine state of division as the covering power increases with the fineness of division.

This invention has for its object to produce from titaniferous iron minerals a coloring matter, which is obtained in a much finer state of division than possible with coloring matter, brought into the finely divided state by means of a grinding process.

The inventor has found that when titaniferous iron minerals are subjected to an oxidizing roasting process at a comparatively low temperature so that sintering or partial smelting does not take place the resulting product when treated with water, will on account of the action of the water be converted into an exceedingly finely divided substance of a much finer state of division than attainable by any mechanical process. The coloring matter obtained possesses red, yellow and other tinges.

The mode of proceeding is preferably as follows: A titaniferous iron mineral for instance titanic-iron ore or ilmenite is in a powdered state oxidized or roasted at a low heat in the presence of air. If this roasting be carried on at a not too high temperature (about 500 centigrade) at which no sintering together or partial smelting takes place, a powder is obtained which after ordinary treatment is of a reddish color and which by treatment with water gives off to this latter an exceedingly finely divided powder suspended in the water and of different tinges according to the duration and degree of heat employed.

It has been found that the coloring matter does not always become suspended or given off to the water by merely treating the product with water even if it be ground. Thus in some cases it has proved necessary to remove the water employed in the first treatment of the roasted product and to supply a new and fresh amount of water. After the water has been renewed several times, the roasted product begins to readily and quickly give off to the water, with which it is treated, the above described exceedingly finely divided coloring powder. By continuous treatment with water practically the whole amount of the original roasted product is converted into coloring powder. In the state in which the coloring powder is now at hand, it is very difficult to get the whole amount of it precipitated. Even after several weeks standing a part of the powder is still in suspension in the water. It has been found however, that the coloring powder which is in the above mentioned state finely suspended in water, could readily be brought to precipitation if there is added to the water small amounts of an acid, base or salt, etc. soluble in water.

The above fact indicates that it is not always sufficient to merely treat the product with water, but that the water first employed should be removed, etc. Examinations have shown that the reason of this is found in the fact, that the product after the roasting treatment contains some substances soluble in water. As long as these substances are present the characteristic suspending of the coloring matter is prevented and does not take place before said substances are sufficiently removed by the described treatment with water. When the powder has first been suspended in water it can again be brought to precipitation by the addition of a substance soluble in water.

The powder obtained by suspension in water followed by precipitation and drying is now applicable as a paint—titanic-iron paint. The obtained product may also be employed as a polishing powder. The product may be modified by addition of one or more other substances such as for instance sodium chlorid, barium oxid, etc. These substances may be added before the roasting takes place or they may be added afterward and the product heated more or less a second time without or with the presence of air.

For producing the above mentioned coloring matter besides titanic iron ore or ilmenite also other iron ores containing titanium may be employed. These latter are freed from the main content of magnetite or other constituent for instance by magnetic separation. The material obtained from this separation process is then roasted and suspended in water in the manner described above.

Above it has been stated that it is sometimes necessary to repeatedly wash the roasting product in order to remove certain soluble substances. Instead of doing this the soluble salts may be precipitated by adding after the roasting process an acid, a salt or a base, forming with soluble salts insoluble compounds; or the formation of soluble salts may be altogether prevented by adding before the roasting process a suitable acid, salt or base.

Claims.

1. The process for producing coloring matter from titaniferous iron minerals by subjecting said minerals to an oxidizing roasting process at low temperature and treating said roasted product with water in order to obtain the product in finely divided form.

2. The process for producing coloring matter from titaniferous iron minerals consisting in subjecting said minerals to an oxidizing roasting process, whereby an unsintered roasted product is obtained, repeatedly washing said roasted product with water to remove soluble substances and producing a suspension of the coloring matter in water.

3. The process for producing coloring matter from titaniferous iron minerals consisting in subjecting said minerals to an oxidizing roasting process, whereby an unsintered roasted product is obtained and treating said product with water to obtain a suspension of the coloring matter in water, and finally adding to the water containing the suspended product small quantities of an acid a base, a salt or the like soluble in water to effect a rapid precipitation of the exceedingly fine powder.

4. The process for producing coloring matter from titaniferous minerals consisting in subjecting said minerals to an oxidizing roasting process, adding before or after such roasting process a suitable acid, base or salt capable of preventing the formation of soluble substances during the roasting or of forming with the soluble substances insoluble substances and thereupon treating the product with water.

In testimony that I claim the foregoing as my invention, I have signed my name in presence of two subscribing witnesses.

PEDER FARUP.

Witnesses:
 HENRY BORDEWICH,
 M. GUTTORMSUR.